(12) United States Patent
Krieberneg et al.

(10) Patent No.: US 8,479,904 B2
(45) Date of Patent: Jul. 9, 2013

(54) TORQUE SETTING DEVICE

(75) Inventors: August Krieberneg, Koeflach (AT);
Helmuth Sachsenmaier, Graz (AT)

(73) Assignee: MAGNA Powertrain AG & Co. KG, Lannach (AT)

( * ) Notice: Subject to any disclaimer, the term of this patent is extended or adjusted under 35 U.S.C. 154(b) by 484 days.

(21) Appl. No.: 12/776,852

(22) Filed: May 10, 2010

(65) Prior Publication Data

US 2010/0282564 A1 Nov. 11, 2010

(30) Foreign Application Priority Data

May 11, 2009 (DE) .......................... 10 2009 020 782

(51) Int. Cl.
*F16D 27/115* (2006.01)
*F16D 28/00* (2006.01)

(52) U.S. Cl.
USPC ....... 192/20; 192/30 W; 192/70.23; 192/82 P; 192/84.7; 192/93 A

(58) Field of Classification Search
USPC .................... 192/82 P, 70.23, 84.7; 74/79, 80
See application file for complete search history.

(56) References Cited

U.S. PATENT DOCUMENTS

| | | | |
|---|---|---|---|
| 4,019,426 A * | 4/1977 | Wosegien et al. ................ | 92/113 |
| 4,319,672 A * | 3/1982 | Barthelemy .................. | 192/56.2 |
| 5,507,373 A | 4/1996 | Nguyen | |
| 5,678,671 A | 10/1997 | Leimbach et al. | |
| 6,830,141 B1 | 12/2004 | Neelakantan et al. | |
| 7,264,568 B2 * | 9/2007 | Ludwig et al. ............. | 192/30 W |
| 2002/0088292 A1 | 7/2002 | Berger et al. | |
| 2007/0144860 A1 * | 6/2007 | Bowen et al. .............. | 192/70.23 |
| 2009/0260945 A1 * | 10/2009 | Martini et al. .............. | 192/93 A |

FOREIGN PATENT DOCUMENTS

| | | |
|---|---|---|
| DE | 19503137 | 9/1996 |
| DE | 10157504 | 8/2002 |
| DE | 202005017525 | 3/2006 |
| FR | 2826622 | 1/2003 |

* cited by examiner

*Primary Examiner* — Rodney Bonck
(74) *Attorney, Agent, or Firm* — Bachman & LaPointe, P.C.

(57) ABSTRACT

A device for setting the torque transferred from a primary shaft to a secondary shaft by a friction clutch comprises a supporting element and an axially displaceable adjusting element which is rotatable with respect to the supporting element and which is operatively connected to the friction clutch for the actuation of the latter, the adjusting element comprising a toothed ring, and the supporting element and adjusting element cooperating via coupling elements in such a way that a rotation of the adjusting element in relation to the supporting element brings about an axial displacement of the adjusting element in relation to the supporting element. The device comprises a linearly displaceable rack element which is in engagement with the toothed ring of the adjusting element, and an electrically activatable linear drive arrangement for the controlled displacement of the rack element.

10 Claims, 3 Drawing Sheets

TORQUE SETTING DEVICE

BACKGROUND OF THE INVENTION

The present invention relates to a device for setting the torque transferred from a primary shaft to a secondary shaft by means of a friction clutch. The device comprises a supporting element and an axially displaceable adjusting element which is rotatable with respect to the supporting element and which is operatively connected to the friction clutch for the actuation of the latter. The adjusting element comprises a toothed ring, and the supporting element and adjusting element cooperate via coupling elements in such a way that a rotation of the adjusting element in relation to the supporting element brings about an axial displacement of the adjusting element in relation to the supporting element.

Devices of this type are used, for example, in power dividers of motor vehicles with all-wheel drive for the controllable transfer of a drive torque to a primary axle and/or secondary axle of the motor vehicle. For example, arrangements for the controlled engagement of a friction clutch are known, in which two actuator rings coupled via ball grooves and balls are employed in order to achieve the desired conversion of a rotational movement into an axial displacement. DE 20 2005 017 525 describes a clutch system of this type, the adjustable actuator ring having formed on it a helical toothing into which engages a worm wheel which can be driven by means of an activatable electric motor.

An object of the invention is to simplify the set-up of these known devices of the type explained and to make it possible to lower the production costs.

SUMMARY OF THE INVENTION

This object is achieved by providing a linearly displaceable rack element which is in engagement with the toothed ring of the adjusting element, and an electrically activatable linear drive arrangement for the controlled displacement of the rack element.

The electrically activatable linear drive arrangement is capable of displacing the rack element along a straight line by a predetermined amount. This leads, by virtue of the toothed ring engaging in the rack element, to the desired rotation of the adjusting element and therefore, in turn, to the axial displacement of the latter. As compared with the arrangement known from the prior art and consisting of a motor and worm wheel, however, a rack element driven by a linear drive arrangement makes it possible to have more beneficial manufacture and simpler assembly.

Preferably, the toothed ring comprises a first spur toothing and the rack element a second spur toothing, which are in engagement with one another. A spur toothing can be produced more simply and more cost-effectively than a helical toothing.

The electrically activatable linear drive arrangement may be any electrically activatable actuating member. For example, the linear drive arrangement may be a lifting magnet arranged at a fixed location with respect to the supporting element. Alternatively, the linear drive arrangement may be a linear motor. Linear drive arrangements of this type are relatively cost-effective.

The adjusting element can be prestressed with respect to the supporting element in order to generate an engagement movement of the friction clutch. An automatic resetting of the friction clutch can thereby be achieved, for example in order to compensate a wear-induced change in the release clearance. The degree of prestress may be selected, for example, in such a way that the release clearance of the friction clutch is minimal, in particular essentially equal to zero, when the linear drive arrangement is not activated. This means that, when the linear drive arrangement is not activated, the adjusting element is always held at what is known as the kiss point, that is to say in the position in which the frictional components of the clutch just touch one another. This ensures that, even in the case of a progressive wear of the frictional components, an axial displacement by a predetermined amount is always linked to the same clutch torque.

Preferably, the second spur toothing is designed to be wider than the first spur toothing, so that, in the event of an axial displacement of the adjusting element, the rack element remains in engagement with the toothed ring. This ensures that even in the event of an axial displacement of the adjusting element, for example on account of the abovementioned wear resetting, the two toothings are always in complete engagement and cooperate optimally. An uneven load upon the toothing components or even a slipping of one toothing out of the other is avoided.

A position sensor for detecting the linear position of the rack element may be provided in order to communicate the current position of the rack element and therefore the current rotation of the adjusting element to a control arrangement. The control arrangement can use the position indication in order to activate the linear drive arrangement correctly in order to set a desired clutch torque.

As already mentioned above, the supporting element may be designed as a supporting ring and/or the adjusting element as an adjusting ring. A ring-shaped design of the two elements makes it possible to lead the primary shaft through the adjusting mechanism and allows a uniform transfer of force to an engagement component, such as, for example, a pressure plate, which is arranged concentrically with respect to the primary shaft.

Preferably, the friction clutch is designed as a multiple-disk clutch. Since it is necessary, particularly in power dividers, to have the possibility not only of smooth engagement, but also of lengthy operation with an exactly set clutch torque, furthermore, the multiple-disk clutch may be of wet-running design and be integrated into a housing which contains oil for cooling and lubricating the frictional components.

BRIEF DESCRIPTION OF THE DRAWINGS

The invention also relates to a power divider, in particular for a motor vehicle, which comprises a torque setting device according to the invention.

The invention is explained below, merely by way of example, with reference to the drawings.

DETAILED DESCRIPTION

Figure 1:
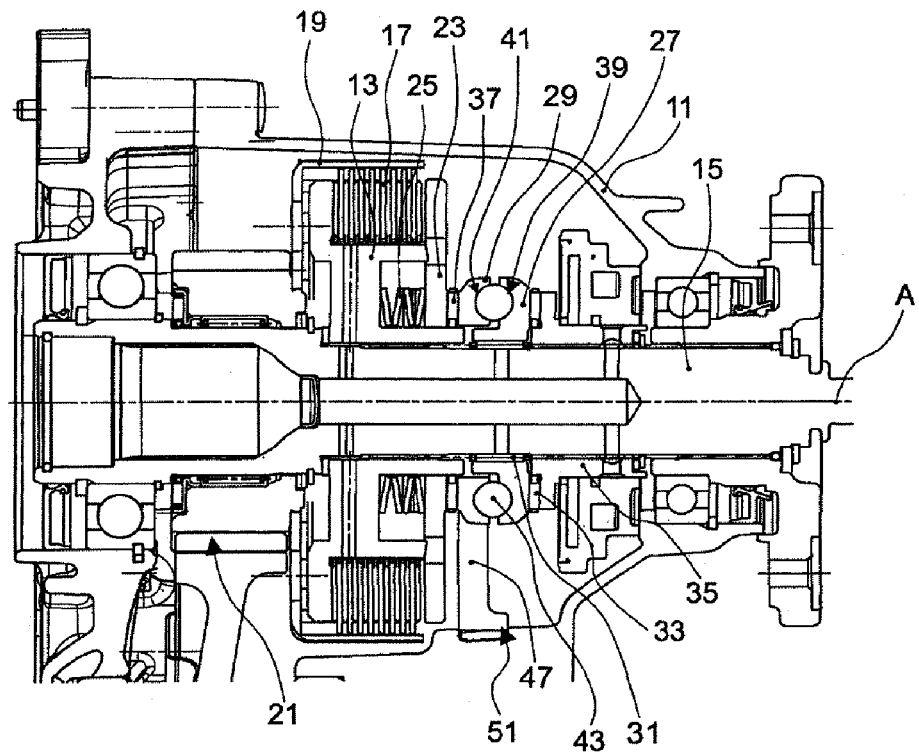
FIG. 1 is a cross-sectional view of a friction clutch according to the prior art, which has a device for setting the torque to be transferred.

FIG. 1 shows a power divider with a friction clutch designed as a multiple-disk clutch. This possesses, within a housing 11, a clutch hub 13 which is connected fixedly in terms of rotation to a driven primary shaft 15. The clutch hub 13 can be coupled frictionally via respective friction disks 17 to a clutch cage 19 which is mounted rotatably about the central axis A of the clutch or of the primary shaft 15 and which is coupled via a cylindrical toothing 21 to a secondary shaft (not illustrated). The frictional connection for transferring a torque between the clutch hub 13 and clutch cage 19 is brought about by means of a pressure plate 23 which is axially displaceable counter to the prestress of a cup spring arrangement 25 and which thereby presses the respective friction disks 17 of the clutch hub 13 and of the clutch cage 19 one against the other.

So that the pressure plate 23 can selectively be displaced counter to the prestress and the clutch thereby actuated, a supporting ring 27 and an adjusting ring 29 are provided which are arranged coaxially with respect to one another and with respect to the central axis A. The supporting ring 27 is held fixedly in terms of rotation and axially nondisplaceably in the housing 11. For this purpose, the supporting ring 27, on the one hand, is supported by means of a radial bearing 31 and an axial bearing 33 on the primary shaft 15 or on a portion 35 of the primary shaft 15 and, on the other hand, is held fixedly in terms of rotation by means of a positive connection to a securing portion, not illustrated, of the housing 11. The adjusting ring 29 is mounted rotatably and axially displaceably with respect to the supporting ring 27 and is supported on the pressure plate 23 by means of an axial bearing 37.

On the sides facing one another, the supporting ring 27 and the adjusting ring 29 in each case possess a plurality of ball grooves 39 and 41. These run in a respective circumferential direction with respect to the central axis A. In each case a ball groove 39 of the supporting ring 27 and a ball groove 41 of the adjusting ring 29 stand opposite one another and thereby in each case surround an assigned ball 43. The ball grooves 39, 41 are inclined with respect to the plane normal to the central axis A, that is to say the ball grooves 39, 41 possess a varying depth along the said circumferential run. What is achieved thereby is that a rotational movement of the adjusting ring 29 in relation to the supporting ring 27 held fixedly in terms of rotation leads to an axial displacement of the adjusting ring 29, so that, as a result of such a rotational movement of the adjusting ring 29, the pressure plate 23 can be offset axially and the clutch can thereby be actuated. The prestress brought about by the cup spring arrangement 25 in this case ensures that, in any rotary position of the adjusting ring 29 in relation to the supporting ring 27, the respective ball 43 remains caught in the assigned ball grooves 39, 41. The adjusting ring 29 has formed on it radially on the outside, along an angular sector, a coupling portion 47 on which a helical toothing, not illustrated, is formed. Via an arrangement, likewise not illustrated, consisting of a helical wheel shaft and drive motor, the coupling portion 47 and therefore the adjusting ring 29 can be rotated with respect to the fixed supporting ring 27, in order thereby to bring about an axial displacement of the adjusting ring 29. On account of the helical toothing and its engagement into the helical wheel shaft, an increased friction can arise during an axial displacement of the adjusting ring 29.

Figure 2:
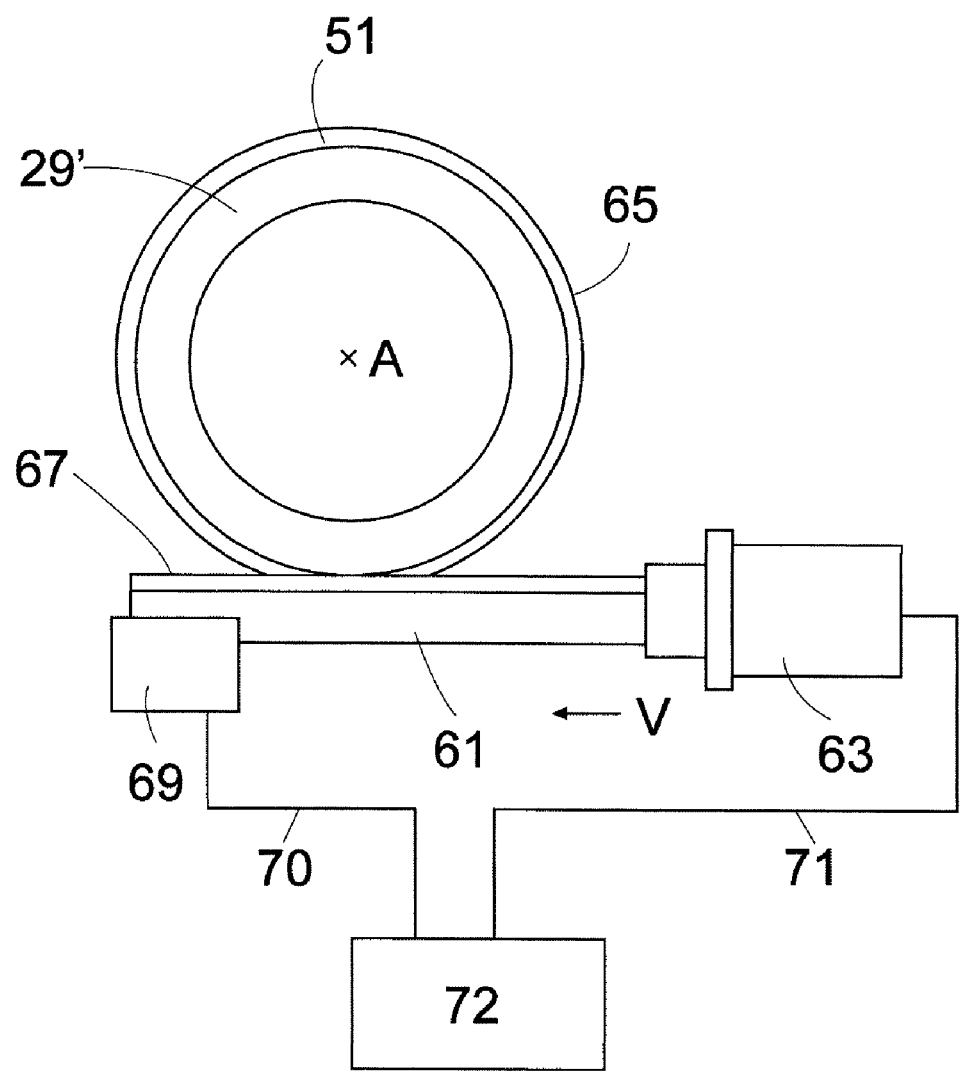
FIG. 2 is a diagrammatic illustration of a torque setting device according to the invention.

FIG. 2 shows a device according to the invention for setting the torque transferred by means of a friction clutch. The device may be employed basically in a power divider according to FIG. 1, and therefore reference is made to FIG. 1 with regard to identical or corresponding components. The device comprises an adjusting ring 29' which is modified, as compared with the adjusting ring 29 according to FIG. 1, in as much as no separate coupling portion 47 with a helical toothing is formed on it. Instead, a toothed ring 51 is formed directly on its circumference and is in engagement with a rack element 61. It should be noted that, in the device according to the invention, too, the toothed ring 51 may be formed on a separate component and/or may extend only along a limited angular sector.

The toothed ring 51 has a first spur toothing 65 and the rack element 61 has a second spur toothing 67, which is designed to engage into the first spur toothing 65. The rack element 61 is arranged in such a way that it is in engagement with the toothed ring 51 and can be displaced linearly, via a lifting magnet 63 coupled to it, in a direction V pointing transversely with respect to the main axis A. Instead of the lifting magnet 63, a linear motor or a similar rectilinear adjusting device may also be provided. The lifting magnet 63 may be fastened directly to the rack element 61 or may be operatively connected to the latter via a separate coupling element. In order to set a desired torque to be transferred by means of the friction clutch, a control arrangement 72 assigned to the friction clutch determines that position of the rack element 61 which is assigned to the desired torque amount and correspondingly activates the lifting magnet 63 via a control line 71.

The step-up ratio between the linear displacement of the rack element 61 and the axial displacement of the adjusting ring 29' may be selected in such a way that the overall stroke of the rack element 61 is sufficient for an exact activation of the lifting magnet 63. A customary value for the axial overall stroke of the adjusting ring 29' is, for example, 0.5 mm. In the case of the selected step-up ratio 40, the overall stroke of the rack element 61 therefore amounts to 20 mm. Positions within an overall stroke of this order of magnitude can be approached with sufficient accuracy by means of commonly available lifting magnets 63.

In order to detect the in each case current position of the rack element 61 and therefore the rotary position of the adjusting ring 29', a position sensor 69 is provided. The position sensor 69 may be, for example, a magnetic or optical sensor which cooperates with a corresponding scale (not illustrated) attached to the rack element 61. However, various other types of position sensors are suitable for detecting the position of the rack element 61 by measurement. The position sensor 69 outputs the detected position to the control arrangement 72 via a signal line 70. A calibration of the position sensor 69 at regular intervals may be expedient in order to allow a conversion of relative position indications, that is to say position changes, into absolute position indications. For this purpose, for example, whenever the power divider is commissioned, the position corresponding to the kiss point can be determined and can be fixed as the basic position.

Figure 3:
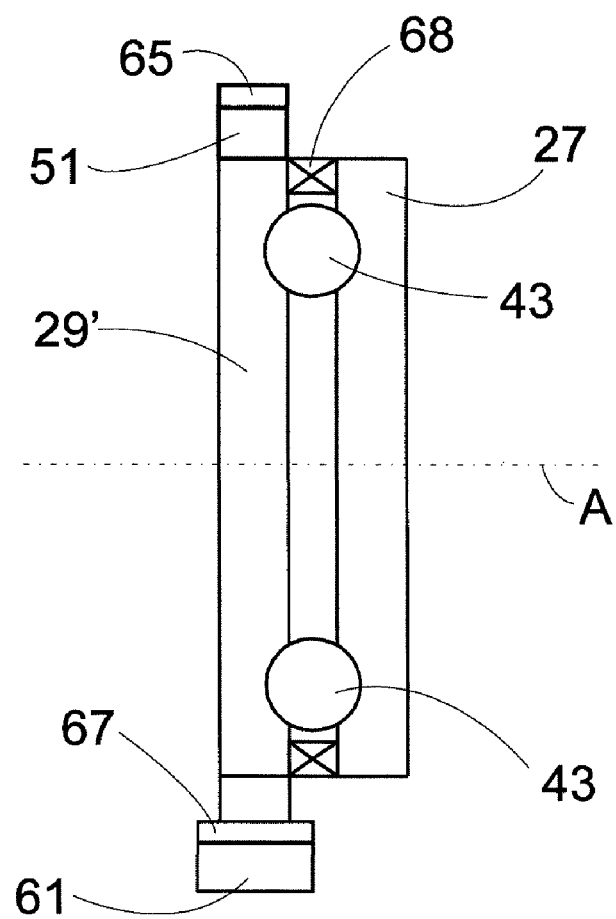
FIG. 3 is a partial side view of the torque setting device illustrated in FIG. 2.

FIG. 3 shows diagrammatically the arrangement illustrated in FIG. 2, consisting of the supporting ring 27 and adjusting ring 29', in an enlarged illustration. Between the supporting ring 27 and the adjusting ring 29' is arranged a spring element 68 which brings about a prestressing of the adjusting ring 29' with respect to the supporting ring 27 in order to generate an engagement movement of the friction clutch. The spring element 68 may be, for example, a helical spring arrangement which rotates the adjusting ring 29' corresponding to an engagement movement. What can be achieved by adapting the characteristic of the spring element 68 is that, when the linear drive arrangement 63 is not activated, the adjusting ring 29' is always adjusted up to the kiss point of the friction clutch, that is to say is brought into a basic position which corresponds to a direct clutch contact of the clutch disks. In an arrangement of this type, therefore, the release clearance of the friction clutch is always kept near zero, in order thus to compensate wear-induced changes in the clutch characteristic, for example due to abrasion and a corresponding decrease in thickness of the clutch disks. As can be seen in FIG. 3, the second spur toothing 67 is designed to be wider than the first spur toothing 65, in order to ensure that, during an axial displacement of the adjusting ring 29', the rack element 61 remains in engagement with the toothed ring 51. Since the toothed ring 51 is in engagement with the rack element 61 via spur toothings, an axial displacement of the adjusting ring 29' while the latter is simultaneously being rotated is easily possible. Distortions or increased friction, such as would occur in the case of a helical toothing, are avoided.

The toothed ring 51 and the rack element 61 can be manufactured cost-effectively and simply as sintered metal parts and do not require any further remachining.

Overall, therefore, a substantially simpler and more cost-effective manufacture of an adjusting mechanism for a power divider is made possible by the device according to the invention.

The invention claimed is:

1. Device for setting the torque transferred from a primary shaft to a secondary shaft by a friction clutch, with a supporting element held fixedly rotationally and axially non-displaceably in a housing and an axially displaceable adjusting element which is rotatable with respect to the supporting element on bearings between the supporting element and the adjusting element, the supporting element is operatively connected to the friction clutch for the actuation of the latter, the adjusting element comprising a toothed ring which engages a linearly displaceable toothed rack element, and the supporting element and adjusting element cooperating via coupling elements in such a way that a rotation of the adjusting element in relation to the supporting element brings about an axial displacement of the adjusting element in relation to the supporting element, wherein the linearly displaceable tooth rack element is in engagement with the toothed ring of the adjusting element, and the rack element on one end is connected to an electrically activatable linear drive arrangement for the controlled displacement of the rack element and on the other end is connected to a position sensor that detects the linear position of the rack element.

2. Device according to claim 1, wherein the linear drive arrangement is a lifting magnet arranged at a fixed location with respect to the supporting element.

3. Device according to claim 1, wherein the linear drive arrangement is a linear motor.

4. Device according to claim 1, wherein the adjusting element is prestressed with respect to the supporting element in order to generate an engagement movement of the friction clutch.

5. Device according to claim 4, wherein the prestress is selected so that, when the linear drive arrangement is not activated, the release clearance of the friction clutch is essentially equal to zero.

6. Device according to claim 1, wherein the second spur toothing is designed to be wider than the first spur toothing, so that, in the event of an axial displacement of the adjusting element, the rack element remains in engagement with the toothed ring.

7. Device according to claim 1, wherein the supporting element is designed as a supporting ring and/or the adjusting element as an adjusting ring.

8. Device according to claim 1, wherein the friction clutch is designed as a multiple-disk clutch.

9. Device according to claim 1, wherein the device is an element in a power divider for a motor vehicle.

10. Device according to claim 1, wherein the toothed ring comprises a first spur toothing and the rack element a second spur toothing, which are in engagement with one another.

* * * * *